Figure 1:
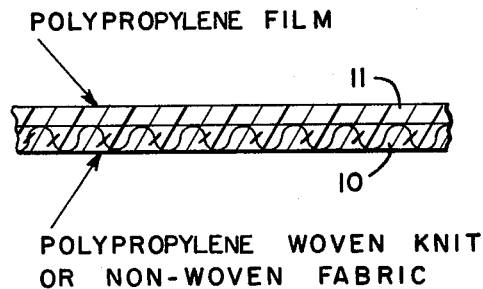

Sept. 14, 1965    A. S. EHLERS    3,205,913
FLUID CONTAINING MEANS
Filed Nov. 13, 1962

INVENTOR.
ARTHUR SPERRY EHLERS
BY
ATTORNEYS 3,205,913
FLUID CONTAINING MEANS
Arthur Sperry Ehlers, Bettendorf, Iowa, assignor to Ametek, Inc., New York, N.Y., a corporation of Delaware
Filed Nov. 13, 1962, Ser. No. 237,120
3 Claims. (Cl. 138—125)

This invention relates to articles for containing or conveying fluid under pressure and/or flow, made from an impervious, light-weight, abrasion resistant material.

An attempt to coat woven fabric with a film of dissimilar material results in a coating that is at best a physical bond which is subject to cracking and separation from the base material.

The principal object of the invention is to provide an impervious, light-weight, abrasion resistant article capable of containing or transporting fluids such as air or the like.

It is known that plastic films are, for all practical purposes, substantially impervious. However, articles made from such films which are adapted to conduct gases often lack structural stability and strength to withstand use in industry. One such use involves the conduction of gases such as air under super-atmospheric pressures into mines where the conduit is subjected to substantial abrasive action as it is carried or mounted in the mine. Another use would be an air supported wall of a structure such as a shelter.

Woven, knit or other fibrous plastic fabric materials are pervious and therefore lack the capacity to contain super-atmospheric pressure gas or air, although such plastic fabrics do possess substantial abrasion resistant characteristics.

In one aspect of the invention, a sheet of woven, knit or fibrous fabric made from polypropylene fibers and coated or impregnated with polypropylene may be formed into a container or conductor of the desired shape by overlapping its edges to make seams.

In another aspect of the invention, the film coated or impregnated side of the polypropylene coated or impregnated polypropylene fabric is extremely smooth and conducive to the passage of air in non-turbulent form, and preferably where such use is desired, such side forms the inner surface of the container or duct.

In still another aspect of the invention, the overlapped seams forming the article may be stitched or heat sealed to form an airtight seam.

In still another aspect of the invention, when the article to be formed is a gas or air conduit, encircling straps may be provided for suspending the conduit.

In still another aspect of the invention, tubular conduits made from the coated fabric may include metal rings at the ends thereof for facilitating connecting the ends to apparatus supplying or utilizing the super-atmospheric pressure air or gas.

The above, other objects and novel features of the invention will become apparent from the following specification and accompanying drawing which is merely exemplary.

Figure 2:
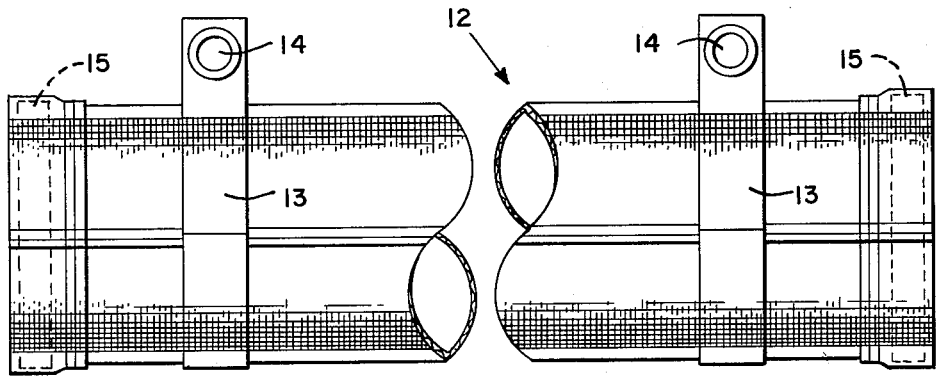

In the drawing:

FIG. 1 is a sectional view of a polypropylene impregnated fabric made from polypropylene fibers; and FIG. 2 is a section of conduit for conducting pressurized air or gas and to which the principles of the invention have been applied.

It has been found that articles made from a woven, knit or fibrous plastic fabric containing polypropylene fibers and the like, which fabric has been coated or impregnated with a film of polyproplene, will have a high degree of imperviousness as a container for super-atmospheric pressure air or gases and still provide excellent abrasion resistance necessary for certain industrial purposes while at the same time being of lightweight construction.

Polypropylene is the lightest of all plastics, having a specific gravity of 0.9. Polypropylene coated or impregnated polypropylene fabric is highly resistant to corrosion, abrasion and fatigue, can withstand heat up to 275° F., and possesses a high tensile strength.

Referring to the drawing, and particularly to FIG. 1, a section of woven fabric 10 is disclosed in which the fibers forming the fabric are polypropylene fibers. A layer or film 11 coats or impregnates the fabric 10, and this coating or impregnant also is a film of polypropylene. Because both the fabric and coating are from the same chemical family, the resulting coated or impregnated fabric is weld bonded together and not a lamination of two layers. The coated or impregnated side of the fabric is extremely smooth while the other side produces a tough, woven fabric surface. It is to be understood that the fabric 10 may be made of knit fibers or unwoven fibers so long as the resulting fabric is a tough abrasion resistant product.

Referring to FIG. 2, a conduit 12 is shown which has been made from a sheet of the material of FIG. 1. It is formed by overlapping the longitudinal edges of the sheet and double stitching the same, although heat sealing and ultrasonic sealing also have proved satisfactory.

The conduit 12 is preferably formed with the smooth coated or impregnated surface inside, providing a tough, woven exterior which is particularly resistant to abrasion. At intervals along the conduit, straps 13 of fabric or the like may encircle the conduit and may include metal rings 14 for facilitating supporting the conduit from an oper-head support.

Additionally, the ends of the conduit may be reversed and stitched in a manner to cover end rings 15 for facilitating the connection of the ends of the conduit to apparatus supplying or using the gas or air conveyed within the conduit.

As an example, an air conduit was made of a polypropylene multifilament fiber woven into a 2/2 broken twill weave pattern for maximum abrasion resistance, with an ounce weight per square yard of 6.2, thread count per inch of 58 by 46 and with ASTM/Grab tensile strength of 500 pounds per inch in the warp and 400 pounds per inch in the filling. The thickness of the polypropylene film coating was .003" which was hot-melt extruded onto the surface of the fabric at an extrusion head temperature of 600° F.

Although the various features of the article made from polypropylene coated or impregnated polypropylene fabric have been shown and described to fully disclose one embodiment of the invention, it will be evident that changes may be made in such details and certain features may be used without others without departing from the principles of the invention.

What is claimed is:

1. A thin light weight abrasive resitant fluid container adapted to confine a fluid medium, said container being made from a sheet of impervious polypropylene film bonded on a fabric, said fabric being made from polypropylene fibers.

2. A thin light weight abrasive resistant conduit through which a fluid medium is adapted to be forced, said conduit being made from a sheet of impervious polypropylene film bonded on a fabric, said fabric being made from polypropylene fibers, the coated surface of said sheet forming the inner surface of said conduit.

3. A thin light weight abrasive resistant conduit through which a fluid medium is adapted to be forced, said conduit being made from a sheet of impervious polypropylene film bonded on a fabric, said fabric being made from polypropylene fibers; and metal connector rings at the ends of said conduit covered by said coated fabric.

References Cited by the Examiner
UNITED STATES PATENTS

| 1,211,067 | 1/17 | Braly | 138—107 |
| 2,932,323 | 4/60 | Aries | 138—137 |
| 3,042,737 | 7/62 | Brumbach et al. | 138—125 |

OTHER REFERENCES

Cronin, E. W.: "Polypropylene," in Mechanical Engineering magazine, pages 72 and 73, October 1958, 138-resins digest, copy in Group 360.

LEWIS J. LENNY, *Primary Examiner*.